(12) United States Patent
Cooper

(10) Patent No.: US 11,465,316 B2
(45) Date of Patent: Oct. 11, 2022

(54) ADDITIVELY MANUFACTURED MANDRELS AND RELATED METHODS

(71) Applicant: The Boeing Company, Chicago, IL (US)

(72) Inventor: William R. Cooper, Maple Valley, WA (US)

(73) Assignee: The Boeing Company, Chicago, IL (US)

(*) Notice: Subject to any disclaimer, the term of this patent is extended or adjusted under 35 U.S.C. 154(b) by 160 days.

(21) Appl. No.: 16/661,891

(22) Filed: Oct. 23, 2019

(65) Prior Publication Data

US 2021/0122087 A1    Apr. 29, 2021

(51) Int. Cl.
| | | |
|---|---|---|
| *B29C 33/38* | (2006.01) | |
| *B29C 33/48* | (2006.01) | |
| *B29C 64/153* | (2017.01) | |
| *B29C 64/40* | (2017.01) | |
| *B33Y 10/00* | (2015.01) | |
| *B33Y 80/00* | (2015.01) | |

(52) U.S. Cl.
CPC ........ *B29C 33/3842* (2013.01); *B29C 33/485* (2013.01); *B29C 64/153* (2017.08); *B29C 64/40* (2017.08); *B33Y 10/00* (2014.12); *B33Y 80/00* (2014.12)

(58) Field of Classification Search
CPC ..... B29C 33/48; B29C 33/485; B29C 33/302; B29C 33/42; B29C 33/442; B29C 33/444; B29C 53/82
See application file for complete search history.

(56) References Cited

U.S. PATENT DOCUMENTS

| | | | |
|---|---|---|---|
| 10,358,890 B2 | 7/2019 | Zhong et al. | |
| 2005/0230552 A1* | 10/2005 | Engwall | B29C 33/485 244/133 |
| 2006/0180704 A1 | 8/2006 | Olson et al. | |
| 2010/0323051 A1* | 12/2010 | Helenius | F16B 21/04 425/161 |
| 2014/0222184 A1* | 8/2014 | Verschueren | G05B 19/4099 700/98 |
| 2016/0339661 A1* | 11/2016 | Jones | B64C 27/473 |
| 2017/0100859 A1* | 4/2017 | Register | B29C 43/02 |
| 2019/0118420 A1* | 4/2019 | Hirabayashi | B29C 33/505 |

* cited by examiner

*Primary Examiner* — Yunju Kim
(74) *Attorney, Agent, or Firm* — Kolisch Hartwell, P.C.

(57) ABSTRACT

An additively manufactured mandrel is disclosed, including a plurality of separable segments arranged to form a main body having a first end and a second end, each separable segment connected to adjacent segments. A first plug connected to the first end, and a second plug connected to the second end of the main body are configured to support the main body during a composite curing process.

20 Claims, 7 Drawing Sheets

ADDITIVELY MANUFACTURED MANDRELS AND RELATED METHODS

BACKGROUND

Many composite parts are manufactured using a layup and cure process that requires a supporting mandrel, mold, or other tooling. Production of such mandrels is slow and expensive, and development of new composite parts is held back by mandrel production lead times. Any revision or repair to a mandrel that is needed may force further delays. Effective mandrels for tubes or ducts are particularly difficult to design and produce, as the mandrels must be removed from the finished duct and are constrained by any non-linearity in the duct geometry. An inexpensive, quickly producible mandrel is needed, which is adaptable to a range of duct geometries.

SUMMARY

The present disclosure provides systems, apparatuses, and methods relating to additively manufactured duct mandrels. In some examples, an additively manufactured duct mandrel includes a main body portion, including a first plug at a first end and a second plug at a second end. The additively manufactured duct mandrel further includes a plurality of separable segments arranged to form the main body, and each separable segment connected to adjacent segments.

In some examples, an additively manufactured mandrel for manufacturing a composite tube, includes plurality of additively manufactured segments and an additively manufactured linkage device connecting the segments to a form a main body having a first and second end. The additively manufactured duct mandrel may further include an outer shape of the main body corresponding to an inner shape of a composite tube section to be manufactured and the linkage device configured to maintain the outer shape of the main body during a composite curing process.

In some examples, a method of manufacturing a mandrel for use in a composite manufacturing procedure includes printing plurality of separable segments configured to form a main body having a first end and a second end, and printing a first plug connected to the first end of the main body and configured to maintain assembly of the plurality of separable segments during the composite manufacturing procedure.

Features, functions, and advantages may be achieved independently in various examples of the present disclosure, or may be combined in yet other examples, further details of which can be seen with reference to the following description and drawings.

DETAILED DESCRIPTION

Figure 1:
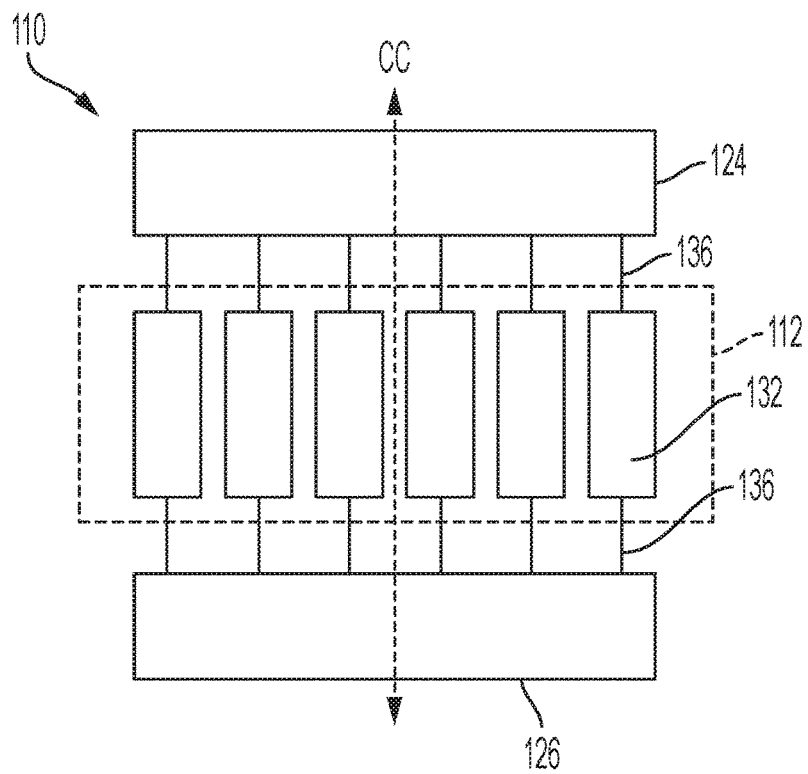
FIG. 1 is a schematic diagram of an illustrative mandrel manufactured by an additive manufacturing process in accordance with aspects of the present disclosure.

Various aspects and examples of an additively manufactured mandrel for composite duct layup, as well as related methods, are described below and illustrated in the associated drawings. Unless otherwise specified, a mandrel in accordance with the present teachings, and/or its various components may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed examples. The following description of various examples is merely illustrative in nature and is in no way intended to limit the disclosure, its application, or uses. Additionally, the advantages provided by the examples described below are illustrative in nature and not all examples provide the same advantages or the same degree of advantages.

This Detailed Description includes the following sections, which follow immediately below: (1) Overview; (2) Examples, Components, and Alternatives; (3) Illustrative Combinations and Additional Examples; (4) Advantages, Features, and Benefits; and (5) Conclusion. The Examples, Components, and Alternatives section is further divided into subsections A through E, each of which is labeled accordingly.

Overview

In general, a mandrel in accordance with the present teachings includes a plurality of separable segments which form a main body. The segments are additively manufactured, and may be printed as a unitary part that is configured for subsequent separation. For example, the mandrel may be printed with a thin layer of material extending between each pair of adjacent segments. The layer may be sufficiently thin and/or scored such that the layer breaks when the adjacent segments are subjected to a selected threshold level of separating force. For another example, the mandrel may be printed with one or more tabs, pins, and/or other projections extending between each pair of adjacent segments.

An outer surface of the main body of the mandrel is configured for layup of a composite material to form a duct, tube, pipe, and/or other generally tubularly shaped part. The main body may therefore have an exterior geometry matching a desired interior geometry of the duct. The main body may include linear portions, angled or elbow portions, tapering, projections, and/or any desired geometry. The mandrel is further configured to support the composite material during a curing process. The mandrel may therefore comprise a heat-tolerant material or materials.

The main body of the mandrel may be hollow. That is, the separable segments may form a cylindrical and/or tubular main body, which includes an interior cavity. The mandrel may further include a plug at each of a first end and a second end of the main body. The plug may include a cap portion and a support member, where the cap portion is connected to the respective end of the main body and the support member is disposed inside the interior cavity of the main body. Each of the cap portion and support member may be printed as part of the mandrel, and may be described as unitary with the main body of the mandrel.

The cap portion may be connected to an end of each of the separable segments. The support member may not be directly connected to the separable segment, and instead connected only to the cap portion. The cap portion may be configured for disconnection from the separable segments, by cutting or other method. The support member may be spaced from the separable segments, but configured to support the separable segments against external forces. For example, the support member may help the separable segments to maintain the form of the main body during deposition of a composite tape onto the exterior surface of the main body.

FIG. 1 is a schematic diagram of an additively manufactured mandrel 110 in accordance with the present teachings. The mandrel includes a plurality of separable segments 132, which together form a main body 112. The main body may have a shape corresponding to a desired shape of an internal cavity of a duct or tubular component.

Each segment 132 may be elongate, with any desired cross-sectional shape, and may extend from a first end to a second end of the main body. Segments 132 may be directly connected to one or more other segments, or may be spaced from one another. Segments 132 and main body 112 are centered around a centerline CC, which may be linear or non-linear. Centerline CC may match a desired centerline of a duct or tubular component.

Mandrel 110 further includes a first plug 124 and a second plug 126. Segments 132 are connected to the first and second plugs by a plurality of links 136. Each of segments 132 is connected to first plug 124 by one link and to second plug 126 by another link. Links 136 may be additively manufactured or added subsequent to printing of mandrel 110. The links may be single-use non-repeatable connections or may be reconnectable and repeatable connections.

A method of using a mandrel in accordance with the present teachings includes using the mandrel to form a duct or other part from a composite material and supporting the formed part with the mandrel during a curing process. The method further includes separating the plurality of separable segments from one another and removing the segments from the cured duct. Separating the segments may include cutting the connection between the cap portion of each plug and the segments and removing both plugs. Separating the segments may further include twisting, pulling, and/or otherwise moving each of the segments to disconnect the segment from adjacent segments.

A mandrel in accordance with the present teachings may be disposable, and/or may be configured for re-use. For example, the plurality of separable segments may be disconnected from one another by breaking thin connecting tabs and once removed from a cured duct the segments may be discarded or recycled. For another example, the separable segments may be disconnected from one another by disengaging a magnetic connection to the cap portions of the plugs. Such segments may be re-assembled by reengaging the magnetic connection, and the mandrel may be used for manufacture of additional composite ducts.

EXAMPLES, COMPONENTS, AND ALTERNATIVES

The following sections describe selected aspects of exemplary additively manufactured mandrels as well as related systems and/or methods. The examples in these sections are intended for illustration and should not be interpreted as limiting the entire scope of the present disclosure. Each section may include one or more distinct examples, and/or contextual or related information, function, and/or structure.

A. Illustrative Mandrel

As shown in FIGS. 2-6, this section describes an illustrative mandrel 210 used for forming a duct 310. Mandrel 210 is an example of an additively manufactured mandrel as described above.

Figure 2:
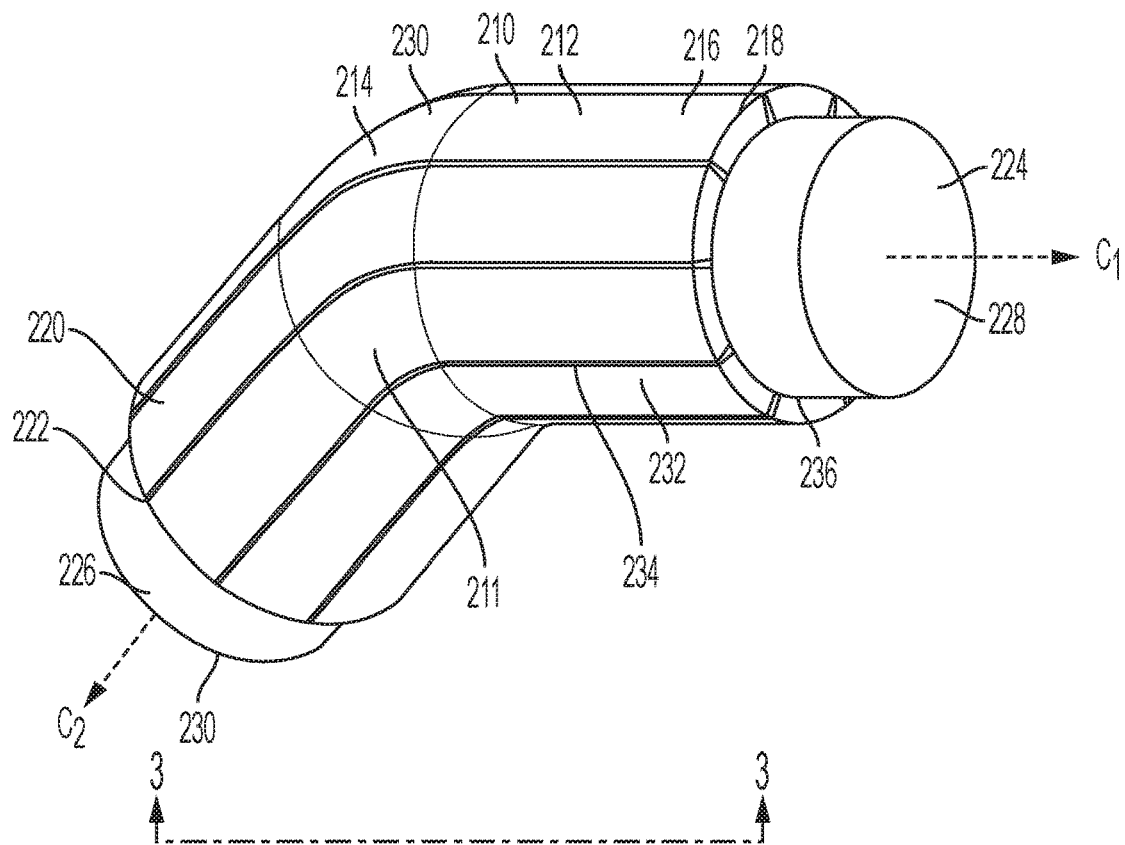
FIG. 2 is an isometric view of an illustrative additively manufactured mandrel manufactured as described herein.
Figure 3:
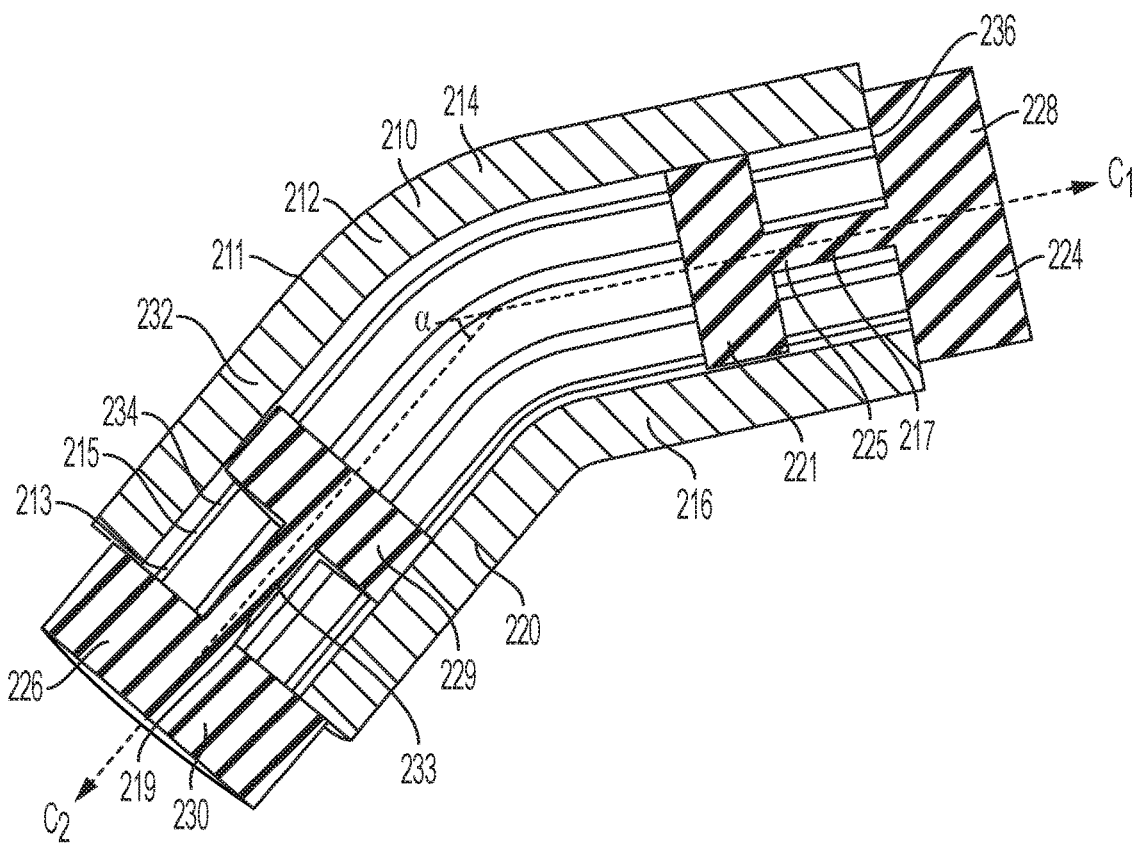
FIG. 3 is a cross sectional view of the mandrel of FIG. 2, along plane 3-3 in FIG. 2.

As depicted in FIG. 2, mandrel 210 includes a mandrel main body 212 having a central elbow portion 214. The elbow portion is sandwiched between a first linear portion 216 at a first end 218 and a second linear portion 220 at a second end 222 of the mandrel. As shown in FIG. 3, an angle α is formed between a first central axis C1 coaxial with the first linear portion 216 and a second central axis C2 coaxial with second linear portion 220. Angle α defines an extent of a bend of central elbow portion 214. Angle α may range from 0 to 180 degrees, but in the present example angle α is approximately 40 degrees.

Referring again to FIG. 2, main body 212 is connected at first end 218 to a first plug 224 and at second end 222 to a second plug 226. The first and second plugs are configured to support the main body during a duct manufacturing process. In the present example, a diameter of first end 218 is the same as diameter of second end 222 defining an overall cylindrical mandrel structure with a bend at central elbow portion 214.

In the present example, mandrel 210 has a cylindrical structure with a circular cross section. In some examples a cross section of first linear portion 216 of the mandrel may be same or different from a cross section of the central elbow portion 214 and/or a cross section of second linear portion 220. Alternatively, the mandrel may have varying cross sections along the length of the mandrel.

In general, main body 212 may have any appropriate geometry. In some examples, main body 212 may include any number of linear portions adjacently placed or alternating with elbow portions, and arranged in any pattern to form a linear, non-linear, or curvilinear mandrel having a plurality of twists and turns. In some examples, the diameter of first end 218 is greater than the diameter of second end 222, forming mandrel structure which tapers from the first end to the second end. In some examples, the diameter of mandrel 210 increases from first end 218 to a central point and decrease back to second end 222, forming a convex mandrel.

As shown in FIG. 2, main body 212 includes and is defined by ten separable segments 232 extending from first plug 224 at the first end to second plug 226 at the second end. In some examples, main body 212 is defined by at least two or more adjacently placed segments, or by any effective number of segments. Outer surfaces of each of the adjacent segments collectively define an outer layup surface 211 of main body 212.

Adjacent segments 232 are connected to each other by a first connection 234 along the entire length of the mandrel. In the present example, the first connection is a printed link formed as part of the additive manufacture of mandrel 210. First connection 234 may be a thin layer of material between the adjacent segments, having a thickness in the range of 0.0625 and 0.1875 inches. In some examples, the layer of material is between 5 and 20 thousandths of an inch. In some examples, the thickness of the layer of material has a lower limit determined by an additive manufacturing technique and/or material.

First connection 234 may be a continuous connection along the entire length of the segments or may be located at definite intervals of length along the adjacent segments. The first connection may be easily severable by an external force, to facilitate removal of the mandrel from a duct, subsequent to a curing stage of a duct formation process. The first connection may be configured to break, and thereby separate adjacent segments 232 from one another, when subjected to a threshold applied force.

First plug 224 and second plug 226 include a first endcap portion 228 and a second endcap portion 230, respectively. The endcap portions protrude outwardly from first and second ends 218, 220 of main body 212. Each endcap portion has a cylindrical structure, with a substantially circular cross-section. Diameters of the first and second endcap portions are identical to one another and are less than the diameters of first and second ends 218, 222 of main body 212. The endcap portions may be of any suitable shape and/or size. However, it is contemplated herein that the endcap portions will be shaped to match the cross-sectional shape of the mandrel main body.

First and second endcap portions 228, 230 are each connected to separable segments 232 by a second connection 236. A first end of each segment is connected to an inner face of first endcap portion 228. Similarly, a second end of each segment is connected to an inner face of second endcap portion 230.

In the present example, first and second endcap portions 228, 230 are fixedly connected to segments 232 by second connection 236. More specifically, the endcap portions are fused to each of the segments. The second connection may be described as a printed link formed as part of the additive manufacture of mandrel 210. Second connection 236 is configured to be broken or be cut to facilitate removal of mandrel 210 from a duct, subsequent to a curing stage of a duct formation process.

Other configurations and connections between segments 232 and the inner faces of endcap portions 228, 230 may fall under the scope of the present invention. In some examples, the second connection is a printed bridge between each of the segments and the endcap portion, where each of the printed bridges is configured to be broken or be cut. In some examples, the second connection is reconnectable. For instance, the second connection may include magnets or fasteners.

FIG. 3 is a cross sectional view of mandrel 210 along plane 3-3 of FIG. 2. As shown, mandrel 210 includes an internal tubular cavity 213 having an inner surface 215 defined by an inner surface of each of segments 232. Inner surface 215 may include a continuous or discontinuous surface based on an extent of first connection 234 between adjacent segments 232.

First plug 224 and second plug 226 include a first support member 217 and a second support member 219 respectively. Each support member extends into internal tubular cavity 213. First support member 217 includes a first support block 221 connected to a distal end of a first shaft 225. A proximal end of the first shaft is in turn connected to first endcap portion 228, thereby connecting the first support block and first endcap portion. Similarly, second support member 219 includes a second support block 229 connected to a distal end of a second shaft 233. A proximal end of the second shaft is connected to second endcap portion 230, thereby connecting the second support block and second endcap portion.

First shaft 225 is coaxial with axis C1 and second shaft 233 is coaxial with axis C2. First and second support blocks 221, 229 are closely surrounded by segments 232. The first and the second support blocks are each spaced from inside surface 215 of internal cavity 213 and from the surrounding segments by a gap G1. Gap G1 may range between 1 to 10 thousandths of an inch. The support blocks support main body 212, to limit compression of the main body during a duct manufacturing process. Gap G1 may be large enough to keep support blocks 221, 229 separate from segments 232 during additive manufacture of mandrel 210, but small enough to allow the support blocks to provide sufficient rigidity to the main body.

Endcap portions 228, 230 are configured to allow removal of support blocks 221, 229. That is, each of first and second plugs 224, 226 is configured to be removed as a unit. Once each second connection 236 is severed or otherwise disconnected, the endcap portions may be drawn away from main body 212 along axis C1 or C2 until the support blocks are pulled free of internal cavity 213 of the main body. In some examples, endcap portions 228, 230 include structures such as handles or grips that are configured to facilitate manipulation of the endcap portions.

Together, each endcap portion, support block, and corresponding shaft form a generally dumbbell-shaped structure. In some examples the dumbbell-shaped structure is symmetrical, with the endcap portion and the support block having identical shapes and dimensions. In some examples, the endcap portion and support block are asymmetrical and have non-identical shapes and dimensions. For instance, in a mandrel for a tapered duct the endcap portion may have a cylindrical shape while the support block may have a smaller, frustoconical shape.

In some examples, each support block is directly connected to the corresponding endcap portion, or may be connected by any appropriate structure. For instance, a support block may be connected to an endcap portion by a hinge, pivotable joint, or flexible stem structure to allow movement of the support block relative to the endcap portion. Such a connection may be advantageous for mandrels having more than one bend, allowing a support block to be pulled around a bend during removal.

In the present example, first support block 221 extends to nearly halfway along first linear portion 216. Similarly, second support block 229 extends to nearly halfway along second linear portion 220. In general, mandrel 210 may include at least one support block for each linear portion of the mandrel. Angle, curve, or bend portions such as central elbow portion 214 may be structurally less susceptible to compression forces and may not require support from a support block. In some examples, mandrel 210 as a whole may be of sufficiently small diameter or first connection 234 may render segments 232 sufficiently rigid that no support blocks are needed.

The location of support blocks along the linear portions of the mandrel may be selected to provide optimal support to segments 232 along the linear sections. In some examples, the support blocks extend proximate to central elbow portion 214 or extend only a limited way into the linear portion, to provide desired support and limit compression of main body 212 during a composite layup process.

Figure 6:
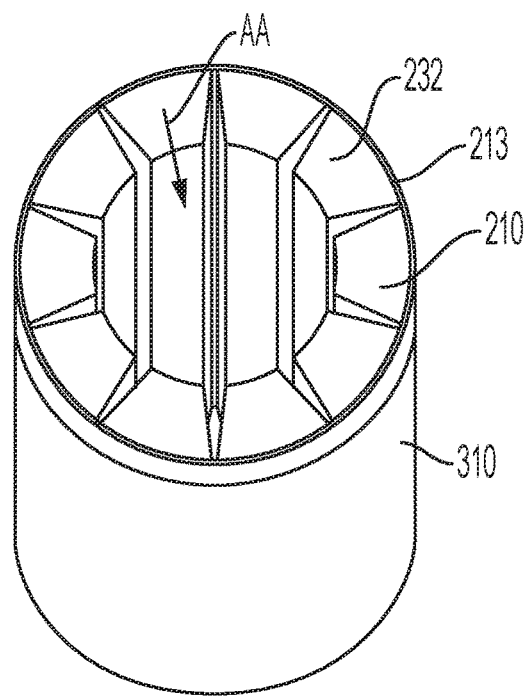
FIG. 6 is an isometric view of an illustrative mandrel devoid of cap portions.

Segments 232 are configured to allow flexing, to facilitate separation of the segments once endcap portions 228, 230 have been removed. As can be seen in FIG. 6, the cross section of each elongate segment is an annulus sector, or a trapezoid having two curved sides. Each segment 232 is thereby spaced from adjacent segments proximate inner surface 215, to allow each segment to be flexed radially inward toward internal cavity 213. Such a flexing motion may apply a force sufficient to break or disconnect the first connection and separate the segments.

In some examples, segments 232 have other cross-sectional shapes appropriate to allow desired motion. For example, each segment may include scoring or gores along the inner surface of the segment, allowing the segment to compress when flexed. In the present example, main body 212 includes ten segments 232. In general, the main body may include any number of segments allowing desired motion while providing effective rigidity of main body 212.

Referring briefly back to FIG. 3, in the present example mandrel 210 is a unitary piece formed by an additive manufacturing process. That is, segments 232, first connection 234, second connection 236, first plug 224, and second plug 226 are all printed as a single piece. Mandrel 210 may be ready for use in composite duct formation immediately after printing and without further processing. The single piece mandrel may also allow manufacture of ducts without requiring any assembly of individual mandrel parts.

Figure 4:
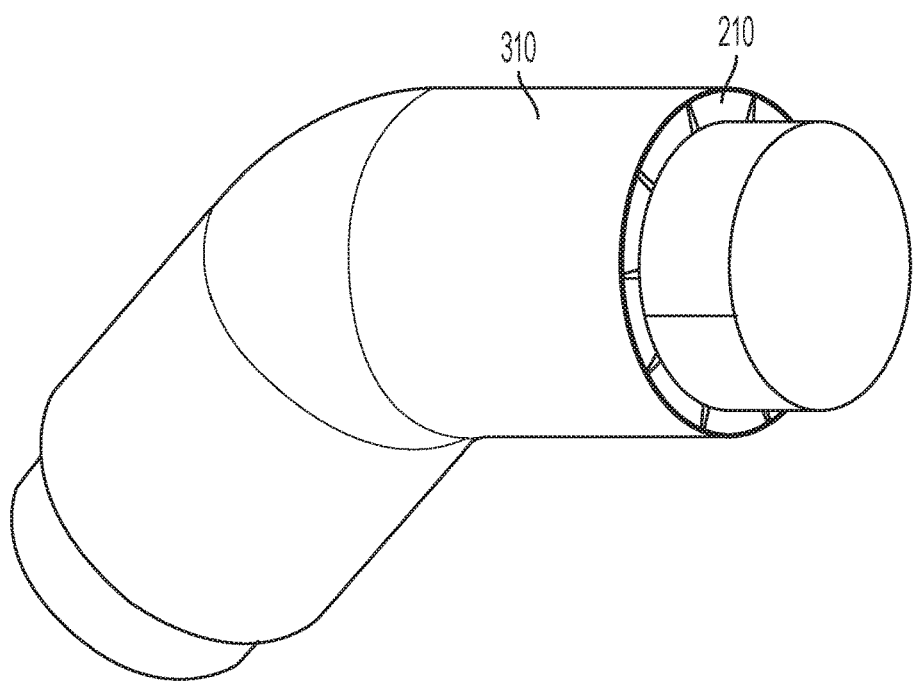
FIG. 4 is an isometric view of the mandrel of FIG. 2, including a duct manufactured by a composite deposition process.

As depicted in FIG. 3 and FIG. 4, outer layup surface 211 of mandrel 210 can be used for deposition of one or more layers of a composite material to form a duct 310. Duct 310 has an inner surface 326 which conforms to outer lay-up surface 211. The composite material may be formed on the mandrel such that duct has an overall shape conforming to the shape of the mandrel. A difference between an outer radius of the duct and the radius of the mandrel defines a thickness of the duct, which may vary along the length of the duct.

In the present example, outer lay-up surface 211 is uniform to facilitate deposition of smooth continuous composite layers. In other examples outer lay-up surface 211 may be imprinted with textures and design features such as concave or convex pockets, ridges and/or grooves, which may be transferred or imparted onto an inside surface of a duct 310 in a complementary fashion. For example, the ridges or grooves imparted to an inside surface of the duct may be used to receive electrical cables or electronic circuitry. For another example, concave pockets formed on the inside surface of the duct may be used to embed thermal or pressure sensors.

Duct 310 may be formed on outer lay-up surface 211 of the body of the mandrel by any composite manufacturing method known to those skilled in the art. After curing of the composite duct, mandrel 210 may be extracted to obtain the duct in a finished form. To facilitate effective support of the duct during curing, mandrel 210 may include one or more heat-resistant materials appropriate to the curing process. In the present example, mandrel 210 comprises a plastic such as nylon 11 or 12 and is manufactured by Selective Laser Sintering (SLS) of a polymer powder. In some examples, the mandrel comprises a metal such as an aluminum alloy and may be manufactured by a Direct Metal Laser Sintering (DMLS) or powder bed process. The mandrel may comprise any material having desired properties, and may be produced by any effective additive manufacturing process.

Figure 5:
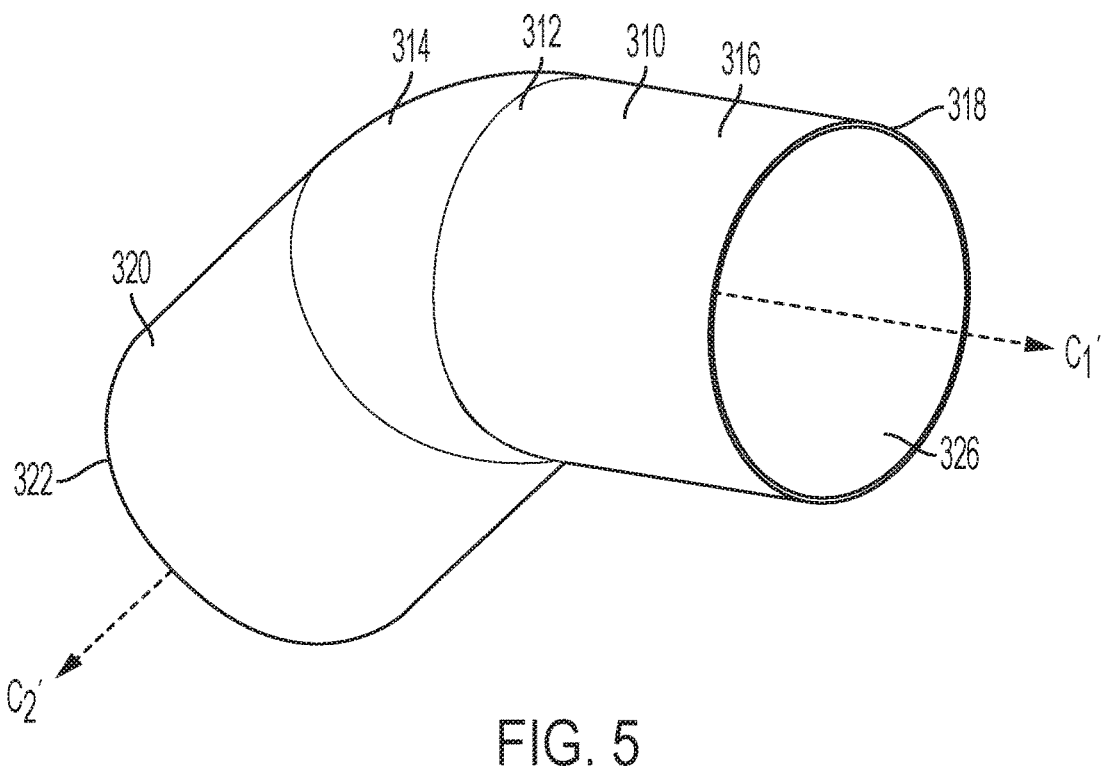
FIG. 5 is an isometric view of the duct of FIG. 4.

As depicted in FIG. 5, when completed, duct 310 includes a duct body 312 having a central elbow portion 314. The elbow portion is sandwiched between a first linear portion 316 at a first end 318 and a second linear portion 320 at a second end 322 of the duct 310. An angle is formed between a first central axis C1' coaxial with the first linear portion 316 and a second central axis C2' coaxial with second linear portion 320, which defines an extent of a bend of central elbow portion 314. The angle is approximately 40 degrees, matching angle α of mandrel 210 (see FIG. 2). Duct 310 has a cylindrical structure with a circular cross section.

In general, mandrel 210 may be configured to allow production of a duct body 312 having any appropriate geometry. However, the size and/or shape of the duct may be limited according to the additive manufacturing equipment and/or process used to produce the mandrel. For example, a DMLS printer may have a maximum print volume of three feet by three feet by thirty inches. For manufacture of ducts larger than such limitations, the mandrel may be printed in two or more parts and bonded or otherwise fixed together prior to composite layup.

Once cured, duct 310 may be obtained in a finished form by extracting mandrel 210 from the duct by a two-step process, as described above. The first step includes breaking of first connection 234 between the endcap portions 228, 230 and segments 232. In the present case, as the endcap portions are fused to the main body, a mechanical slicer may be used to slice the endcap portions from the main body. First end 218 of main body 212 is shown with first endcap portion 228 removed, in FIG. 6.

The second step includes breaking of second connection 236 between each pair of adjacent segments 232. Application of a threshold external force between the adjacent segments may flex the segments and break the second connection. For example, each segment may be flexed radially inward toward internal cavity 213, as indicated by arrow AA in FIG. 6. The separated segments may then be easily removed from the duct.

Mandrel 210 may be disposable and/or recyclable. That is, the mandrel may be discarded after extraction from the duct. Additive manufacture and use of a polymer such as nylon may render mandrel 210 sufficiently inexpensive to produce that disposal of the mandrel after a single use is cost effective. Single-use of mandrel 210 may allow the mandrel to include simple, inexpensive mechanisms for the first and second connections, such as printed links, which are not-reconnectable.

B. Illustrative Reusable Mandrel

Figure 7:
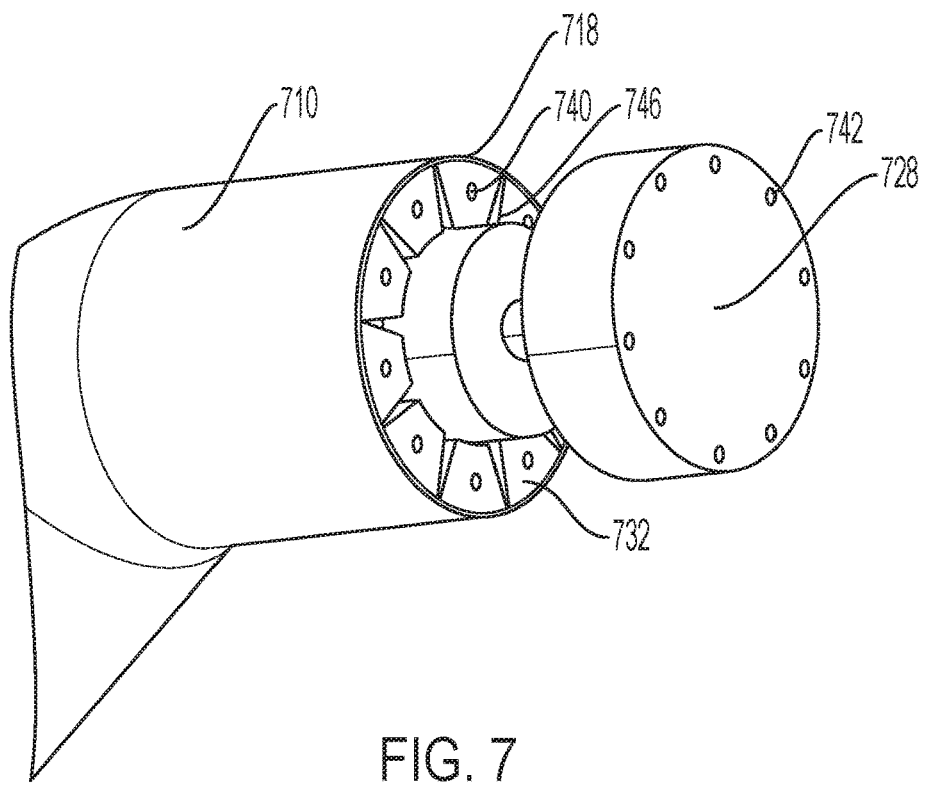
FIG. 7 is an isometric view of an illustrative reusable mandrel with printed pockets or channels for receiving linking members.
Figure 8:
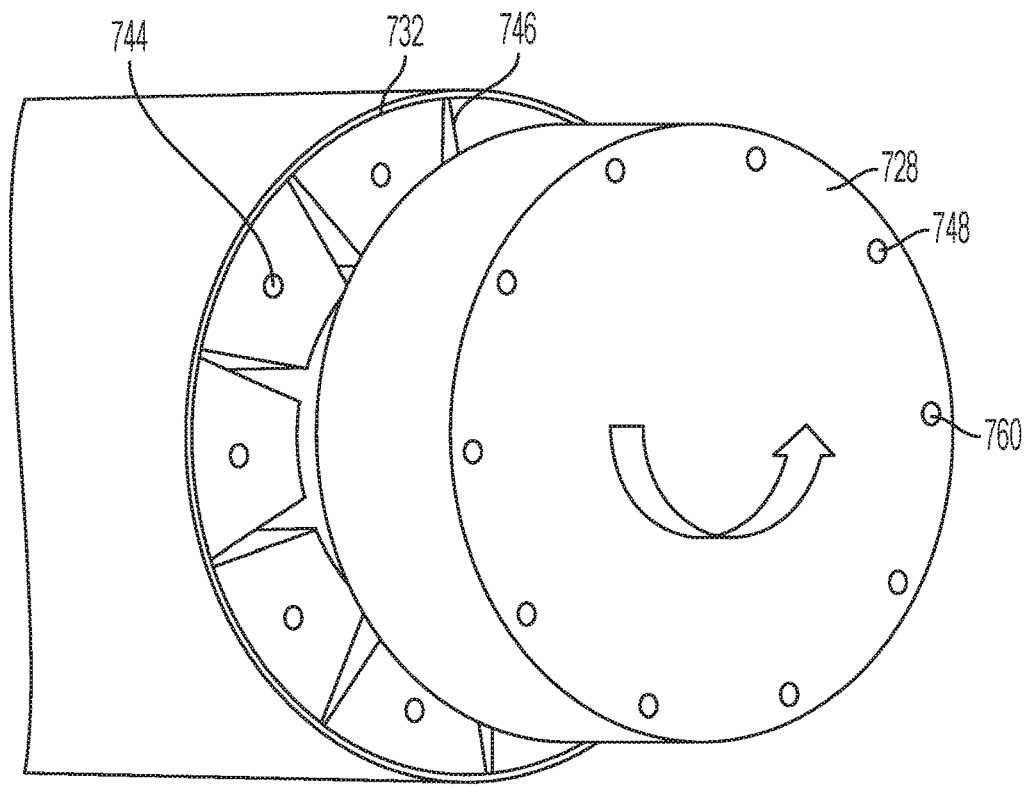
FIG. 8 is an isometric view of an illustrative reusable mandrel with printed pockets for receiving magnetic linking members.
Figure 9:
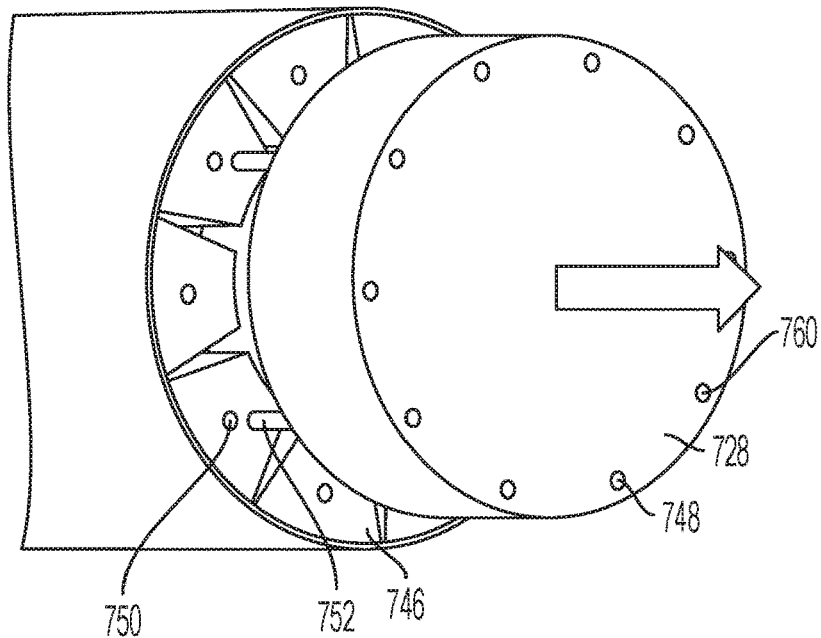
FIG. 9 is an isometric view of an illustrative reusable mandrel with printed channels for receiving mechanical linking members.

As shown in FIGS. 7-9, this section describes an illustrative reusable mandrel 710. Reusable mandrel 710 is another example of an additively manufactured mandrel as described above. Reusable mandrel 710 is substantially similar to mandrel 210, described in Example A. Accordingly, corresponding parts are correspondingly numbered. Those aspects of mandrel 710 which differ from mandrel 210 are described below.

As depicted in FIG. 7, a first endcap portion 728 of mandrel 710 is repeatably coupled to a plurality of separate segments 732. A plurality of primary connecting elements 740 on an end face 746 of the segments at a first end 718 of the reusable mandrel is repeatably engaged with a plurality of secondary connecting elements 742 of first endcap portion 728. The primary and secondary connecting members cooperate to fixedly hold or retain the first endcap portion and segments together and prevent any inadvertent disengagement thereof. A second endcap portion, not shown, is similarly connected to a second end of the mandrel.

Mandrel 710 is configured for repeated use in composite duct manufacture. That is, the mandrel can be disassembled for removal from a completed duct and re-assembled to be used again. To disassemble mandrel 710, primary connecting elements 740 are disconnected from secondary connecting elements 742. First endcap portion 728 and the second endcap portion are thereby disconnected from segments 732. The endcap portions and connected supporting blocks can then be removed from the mandrel. Segments 732 are separate and may therefore be disconnected from one another by removal of the endcap portions. The segments can then be individually removed from a completed duct. To reassemble mandrel 710, primary connecting elements 740 may be reconnected to secondary connecting elements 742 and the endcap portions reattached to each of the separate segments.

In some examples, each of segments 732 may also be repeatably connected to adjacent segments. For example, each segment may include a tertiary connecting element and a quaternary connecting element. The tertiary and quaternary connecting elements of adjacent segments 732 may cooperate to fixedly hold or retain the segments together and prevent any inadvertent disengagement thereof. Preferably the tertiary and quaternary connecting elements between two segments 732 may be disconnectable by application of a targeted radial force on one of the segments. For example, a magnetic connection may be overcome by flexing of the segment toward an internal cavity of the mandrel.

The primary and the secondary connecting elements may be printed as part of the printing process during the additive manufacturing process of mandrel 710, or may be installed subsequent to printing. Similarly, tertiary and quaternary connecting elements may be printed or post-processed. For example, a removable connection mechanism may include a plurality of printed mechanical connectors. For another example, the removable connection mechanism may include magnetic connectors between the endcap portions and the segments. Any effective removable connection mechanism may fall under the scope of the present invention.

FIG. 8 depicts a first example of a repeatable connection mechanism, in which the primary and secondary connecting elements include a plurality of magnets 760. Each end face 746 of each segment 732 includes a retaining pocket 744. First endcap portion 728 includes a plurality of corresponding retaining pockets 748. Preferably, retaining pockets 748 may be disposed about a periphery of an inner face of the first endcap portion. In the present example, as shown in FIG. 8, retaining pockets 748 extend through the first endcap portion from the inner face to an outer face.

Retaining pockets 744 and 748 may be printed as part of the additive manufacture of mandrel 710, or may be formed as part of post-processing of the printed mandrel. Magnets 760 may then be installed in each of retaining pockets 744 and 748. Retaining pockets 744, 748 and magnets 760 can have any of a variety of shapes, sizes, or configurations. Preferably however, the magnet retaining pockets are configured such that the magnet accommodated thereby can be fixedly retained therein. For example, magnets 760 may be retained by a frictional mechanism, adhesive bonding, or a physical barrier.

Magnets 760 of retaining pockets 744 and the magnets of retaining pockets 748 cooperate to retain and align segments 732 and first endcap portion 728. The magnets establish a magnetic connection between the endcap portion and the segments. The polarities, north (N) or south (S), of the magnets of retaining pockets 744 alternate between adjacent segments 732. Similarly, the polarities of the magnets of retaining pockets 748 alternate around the perimeter of the endcap portion.

Therefore, magnets of the endcap portion and the segments of unlike polarities may be matched, (N)-(S), to accomplish a connection, or magnets of like polarities may be matched, (N)-(N) or (S)-(S), to achieve a disconnection between the endcap portion and the segments. In other words, disconnection can be achieved by turning the endcap portion in a clockwise or counter-clockwise direction, both breaking an attraction between like polarity poles and further achieving the disconnection by the repulsion of like polarities.

FIG. 9 depicts a second example of a repeatable connection mechanism, in which the primary and secondary connecting elements include plurality of mechanical connectors and a plurality of magnets.

Similarly to the first example, as shown in FIG. 8, a subset of segments 732 include a retaining pocket 744 on end face 746 of each segment. More specifically, every other or alternating segments include a retaining pocket. First endcap portion 728 includes a plurality of corresponding retaining pockets 748. Magnets 760 are installed in each retaining pocket. In contrast to the first example, magnets 760 of all retaining pockets 744 are oriented to have the same polarity, for instance (N). The magnets of retaining pockets 748 all have an opposite polarity, for instance (S), at the inner face of endcap portion 728. A magnetic connection may be thereby achieved between the endcap portion and the segments.

Additionally, those segments 732 not including a retaining pocket each include a recess 750 on end face 746. A plurality of corresponding alignment pins 752 extend from the inner face of first endcap portion 728. The alignment pins alternate with retaining pockets 748 around the perimeter of the endcap portion. Each alignment pin 752 is configured for receipt in one of recesses 750.

To connect first endcap portion 728 with segments 732, the endcap portion may be aligned appropriately, and the endcap portion and segments brought together such that each alignment pin 752 is received in a corresponding recess 750. At a point of sufficiently close approach, magnets 760 of the endcap portion may engage the magnets of the segments to hold the endcap portion and segments together. To disconnect the endcap portion from the segments, a separating force sufficient to overcome the magnetic attraction may be applied to the endcap portion, and alignment pins 752 may be withdrawn from recesses 750.

In some examples, reusable mandrel 710 includes non-repeatable connections when first printed. For instance, links may be printed between segments 732 similar to those described above for mandrel 210. The reusable mandrel may be used a first time, and the links may be broken to allow extraction of the mandrel from a duct. Subsequent to extraction, the mandrel may be further processed to install or configure a repeatable connection mechanism. For instance, retaining pockets may be machined into the mandrel and magnets may be installed. The mandrel may then be re-used indefinitely by disassembly and re-assembly as described above.

C. Illustrative Method of Additive Manufacture

Figure 10:
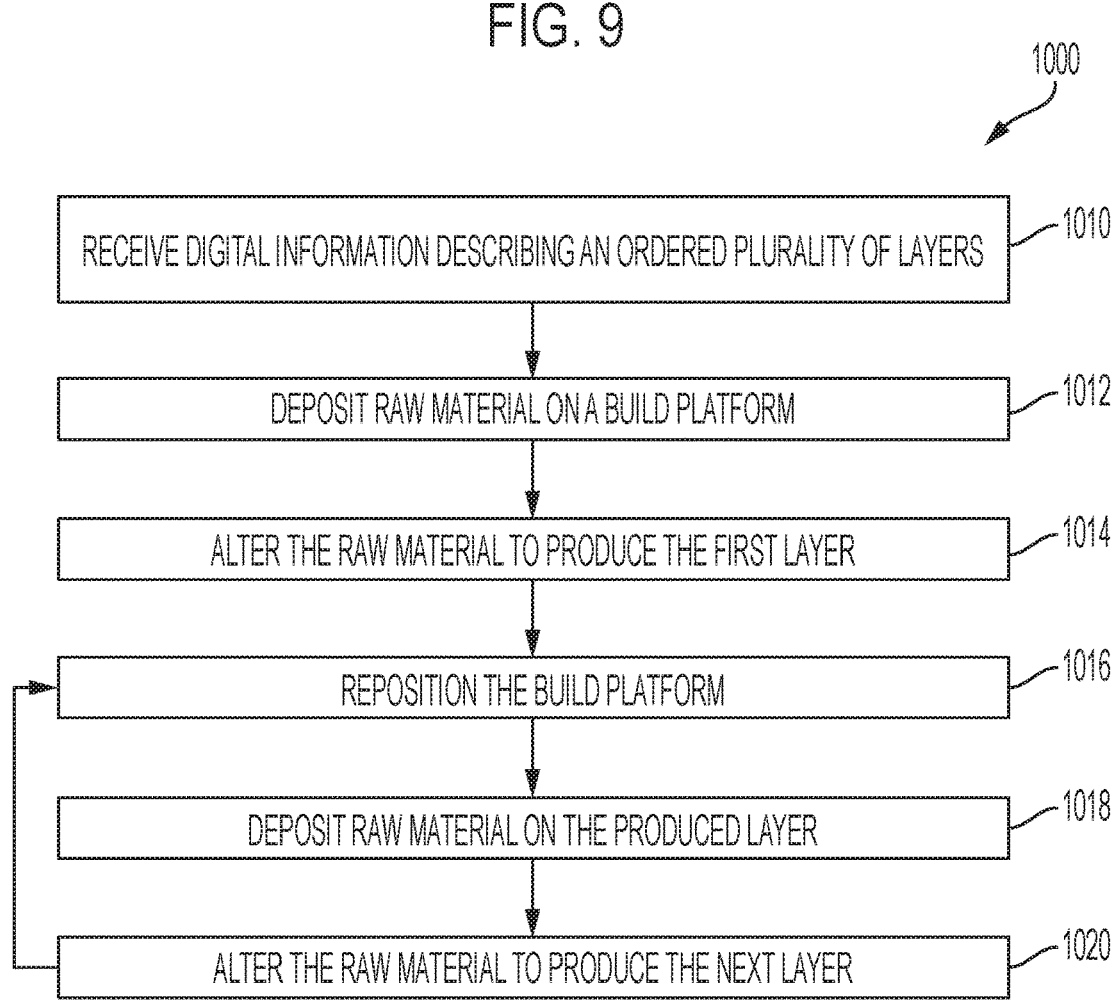
FIG. 10 is a flow chart depicting steps of an illustrative method of additive manufacture according to the present teachings.

This section describes steps of an illustrative method for additive manufacture of a workpiece; see FIG. 10. Aspects of an illustrative additive manufacturing device depicted in FIG. 11 may be utilized in the method steps described below. Where appropriate, reference may be made to components and systems that may be used in carrying out each step. These references are for illustration, and are not intended to limit the possible ways of carrying out any particular step of the method.

FIG. 10 is a flowchart illustrating steps performed in an illustrative method, and may not recite the complete process or all steps of the method. Although various steps of method 1000 are described below and depicted in FIG. 11, the steps need not necessarily all be performed, and in some cases may be performed simultaneously or in a different order than the order shown.

Figure 11:
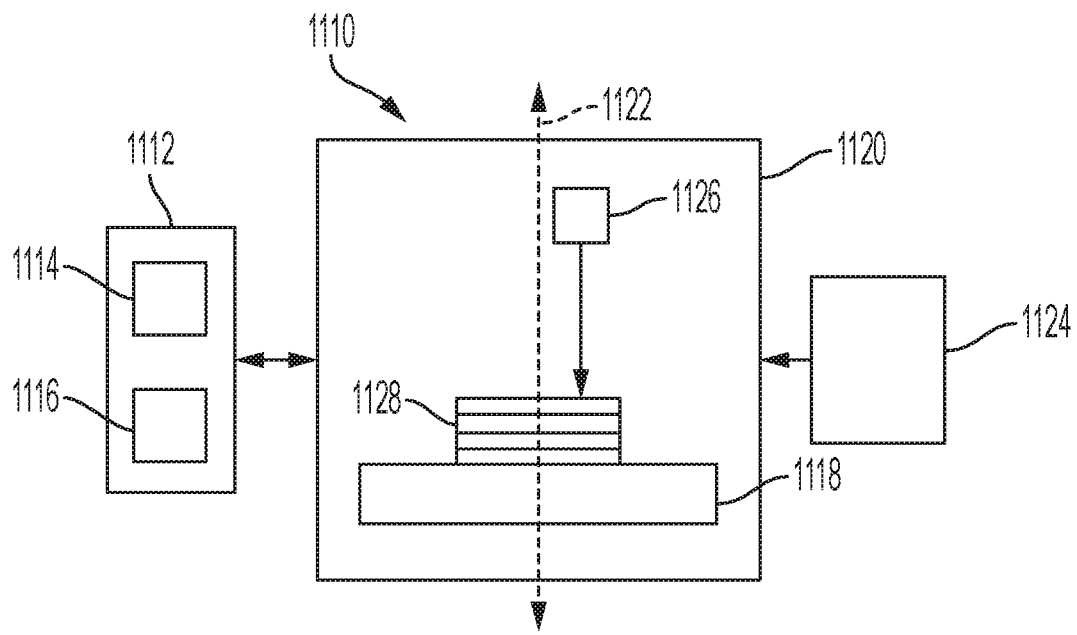
FIG. 11 is a schematic diagram of an illustrative additive manufacturing apparatus as described herein.

At step 1010, digital information describing an ordered plurality of layers is received. The digital information may be received by a computer controller 1112 of an additive manufacturing device 1110 as depicted in FIG. 11. The additive manufacturing device may also be referred to as a printer, or a fabricator. Computer controller 1112 may comprise any data processing system configured to receive digital design information and control functions of printer 1110. The illustrative computer controller shown in FIG. 11 includes a processor 1114 for controlling printer functions and memory 1116 for storing received data.

The received information may include geometric data and/or design details for a plurality of two-dimensional patterns that constitute layers of a three-dimensional object, where the three-dimensional object is a workpiece 1128 to be manufactured. Within examples, workpiece 1128 is a single use mandrel or a reusable mandrel, as described above. The layers may also be described as cross-sections or slices. The plurality of layers is ordered, such that the layers may be numbered or organized from a first layer to a last layer.

Step 1012 of method 1000 includes depositing raw material on a build platform 1118 located in a building environment 1120 of printer 1110. The build platform may comprise a support moveable by computer controller 1112 along a manufacturing axis 1122. The build platform may have a planar surface perpendicular to manufacturing axis 1122.

The raw material may be any material appropriate to additive manufacturing, typically a fluid or powder and including but not limited to photopolymer resin, thermoplastic, plaster, ceramic, and metal. The material may be distributed from a raw material source 1124 such as a hopper, a tank, or a powder source. For example, nylon powder may be swept from a powder source onto a powder bed of build platform 1118 by a brush arm actuated by computer controller 1112.

The raw material may be distributed evenly over build platform 1118, or may be deposited in a selected pattern. Depositing may be done under control of computer controller 1112. In some examples, build platform 1118 is submerged in raw material and depositing may be accomplished by gravity or fluid pressure. In some examples, a print head 1126 connected to raw material source 1124 deposits the raw material in a pattern corresponding to the first layer of the ordered plurality of layers.

At step 1014, the raw material is altered to produce the first layer. In other words, a physical change is induced the deposited material, according to the design information describing the first layer of the ordered plurality of layers and as directed by the computer controller 1112, to realize the first layer as a physical object on the build platform.

The material may be acted on by a print head 1126 of printer 1110, controlled by computer controller 1112. For example, the print head may include a laser that cures a photopolymer by exposure to light or sinters a metal powder by exposure to heat. The print head may be directed by computer controller 1112 to follow a path delineated in the received digital information for the first layer, and/or a path calculated by processor 1114 based on the received digital information.

Step 1016 includes repositioning the build platform. In some examples, build platform 1118 starts a selected distance from print head 1126. The selected distance may be determined by the procedures performed by the print head. Subsequent to production of a layer, the build platform may be repositioned by computer controller 1112 along manufacturing axis 1122 away from print head 1126 by the layer's thickness. That is, the build platform may be moved such that a top surface of the produced layer is the selected distance from print head 1126.

In some examples, build platform 1118 starts in alignment with another element of printer 1110 such as a raw material distribution component. Subsequent to production of a layer, the build platform may be repositioned by computer controller 1112 along manufacturing axis 1122 such that a top surface of the produced layer is aligned with the other element of printer 1110. In some examples, at step 1016 print head 1126 may be repositioned instead of or in addition to build platform 1118. In some examples, step 1016 may be skipped.

At step 1018, raw material is deposited on the layer produced in the preceding step of method 1000. As described for step 1012, the raw material may be any appropriate material and may be deposited any appropriate manner. At step 1020, the raw material is altered to produce the next layer as previously described for step 1014.

Steps 1016 through 1020 may be repeated to produce each layer of the plurality of layers of the received digital information, until the last layer is produced. Steps 1016 through 1020 may include printing connecting bonds, gaps, apertures, pockets, channels, recess, slots or any other physical feature as desired in the workpiece. The produced first through last layers may then comprise workpiece 1128 as described in the received digital information. The workpiece may be removed from the printer and post-processed as desired. For example, the workpiece may be machined from a build plate of the build platform, and then fine details or smooth surfaces may be further finished by machining or other methods. For another example, magnets or other connectors may be installed in the workpiece.

D. Illustrative Method of Mandrel Manufacture

Figure 12:
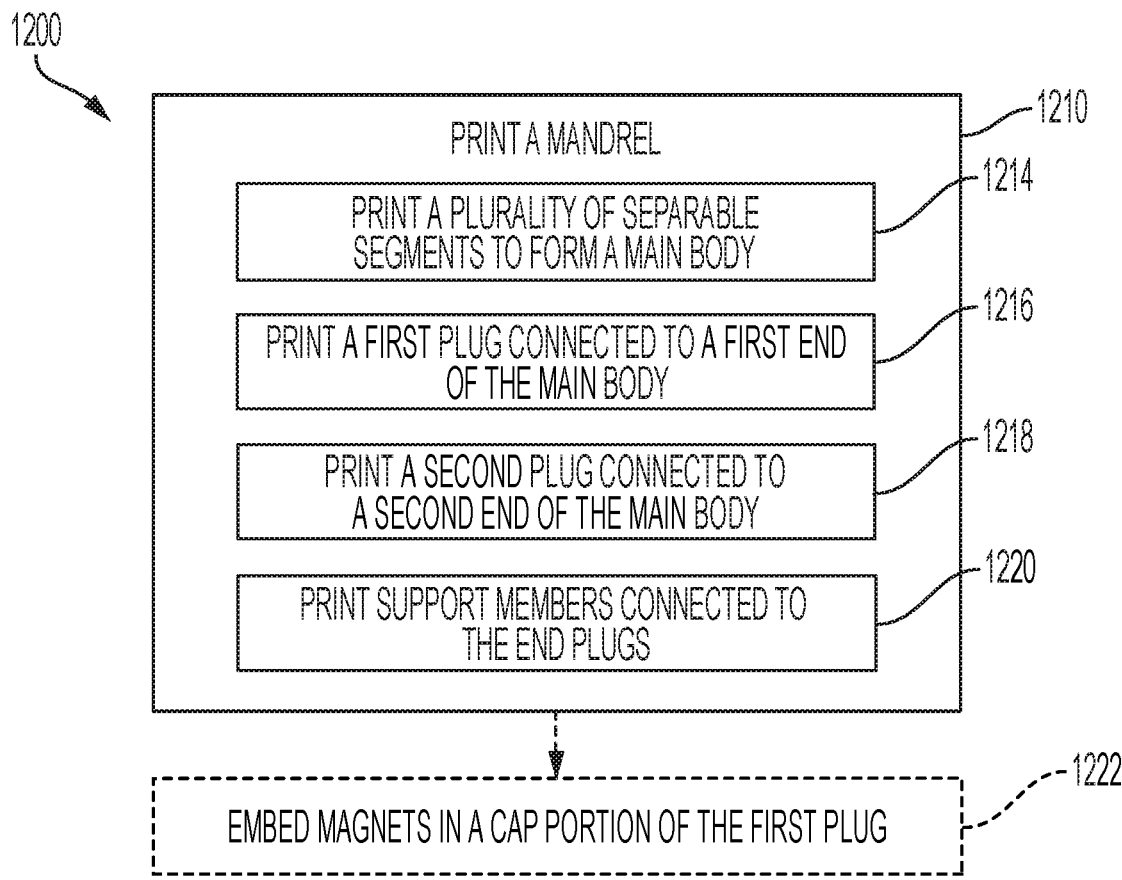
FIG. 12 is a flow chart depicting steps of a method of additively manufacturing a mandrel according to the present teachings.

This section describes steps of an illustrative method for additively manufacturing a mandrel; see FIG. 12. Aspects of mandrels, ducts, additive manufacturing methods, and/or additive manufacturing devices previously described may be utilized in the method steps described below. Where appropriate, reference may be made to components and systems that may be used in carrying out each step. These references are for illustration, and are not intended to limit the possible ways of carrying out any particular step of the method.

FIG. 12 is a flowchart illustrating steps performed in an illustrative method, and may not recite the complete process or all steps of the method. FIG. 12 illustrates an example method 1200 of manufacturing a mandrel for use in a composite manufacturing procedure. Although various steps of method 1200 are described below and depicted in FIG.

12, the steps need not necessarily all be performed, and in some cases may be performed simultaneously or in a different order than the order shown.

Step 1210 includes printing a mandrel structure. The printed structure may be a single unitary piece and may include a main body and one or more end plugs. The main body may be configured with any desired geometry and/or any functional properties. Mandrels 210 and 710 described above are examples of such a mandrel structure. The mandrel structure may be a single-use or reusable mandrel based on the connection between the main body and the end plugs.

Printing may be done according to an additive manufacturing method such as method 1000 described above. In particular, printing may be done by deposition of a raw material on a build platform located in a build environment. The raw material may be any material appropriate to additive manufacturing, including but not a polymer such as nylon 11 or 12, or a metal such as an aluminum alloy. The mandrel structure may have one or more central axes, at least one of which may coincide with a vertical direction or manufacturing axis of the additive manufacturing method. In other words, the mandrel structure may be printed in a vertical direction. In some examples, step 1210 includes printing support structures to accommodate complex geometric orientations of the main body.

The mandrel structure may include one or more linear portions adjacently placed or alternating with one or more curved portions and arranged in any pattern to form a linear, non-linear, or curvilinear mandrel structure. The mandrel structure may include an internal tubular cavity defined by the main body and/or the main body may be described as circumferentially or peripherally surrounding an internal tubular cavity.

The printed mandrel structure may be a complete mandrel, a portion of a mandrel, and/or a component of a mandrel. In some examples, method 1200 may further include incorporating the structure with other un-printed or separately printed components. In some examples, method 1200 may include steps to post-process the mandrel structure such as machining, drilling, and/or surfacing finishing. The method may include machining connector holes in the end plugs of the mandrel structure, and/or machining fastener holes in the end plugs to allow connection of handles to facilitate removal and/or reattachment of the end plugs.

Sub-step 1214 of step 1210 includes printing a plurality of separable segments configured to form the main body having a first end and a second end. Each segment may have a first end, a second end and together the segments may enclose the internal tubular cavity of the main body. Printing the plurality of separable segments may include printing links between adjacent segments configured to break when the segments are subjected to a threshold applied external force as described below in detail. In some examples, sub-step 1214 includes printing connecting element retainers, which are configured to retain connecting elements to establish a link between adjacent segments. For instance, the linking element retainers may be pockets for retaining magnetic connecting elements. In some examples the connecting element retainer is configured to retain mechanical connecting elements such as fasteners.

Sub-step 1216 of step 1210 includes printing a first plug, which is connected to a first end of the main body and configured to maintain assembly of the plurality of the segments during a composite manufacturing process. The first end of the main body may include the first ends of the plurality of separable segments. The first plug may also be described as connected to the first end of each of the plurality of separable segments.

Sub-step 1218 of step 1210 includes printing a second plug, which is connected to a second end of the main body and also configured to maintain assembly of the plurality of segments during a composite manufacturing process. The second end of the main body may include the second ends of the plurality of separable segments. The second plug may also be described as connected to the second end of each of the plurality of separable segments.

Printing of the first and second end plugs may include printing a link between each end plug and the main body, the link being configured to break or be cut after the composite manufacturing process. In some examples, sub-steps 1216 and 1218 include printing connecting element retainers, which are configured to retain connecting elements to establish a link between the end plugs and the separable segments. For instance, the connecting element retainer may be a pocket for retaining magnetic connecting elements. In some examples the connecting element retainer is configured to retain mechanical connecting elements such as fasteners.

Sub-step 1220 of step 1210 includes printing support members which are connected to the first and second end plugs. Each support member is connected to one of the end plugs and extends into the internal tubular cavity of the main body. The support members are configured to provide internal support to the separable segments of the main body during a composite manufacturing process. An external surface of each support member may be separated from an internal surface of the main body by approximately 5 thousandths of an inch, or between 1 and 10 thousandths of an inch.

Optional step 1222 of method 1200 includes embedding magnets in a cap potion of the first plug. The magnets are configured to maintain assembly of the first plug with the main body during the composite manufacturing procedure, and to allow reassembly of the first plug to the main body for reusing the mandrel in a subsequent composite manufacturing procedure. Embedding the magnets may include creating recesses in the cap portion, for instance by machining or drilling, or may include installing the magnets into printed connecting element retainers or pockets. The magnets may be fixed in place by any effective method, including but not limited to adhesive bonding.

In some examples, the optional step further includes embedding magnets in a cap portion of the second plug. In such examples, the magnets are configured to maintain assembly of the second plug with the main body and allow reassembly of the second plug to the main body, similarly to the first plug.

E. Illustrative Method of Duct Manufacture

Figure 13:
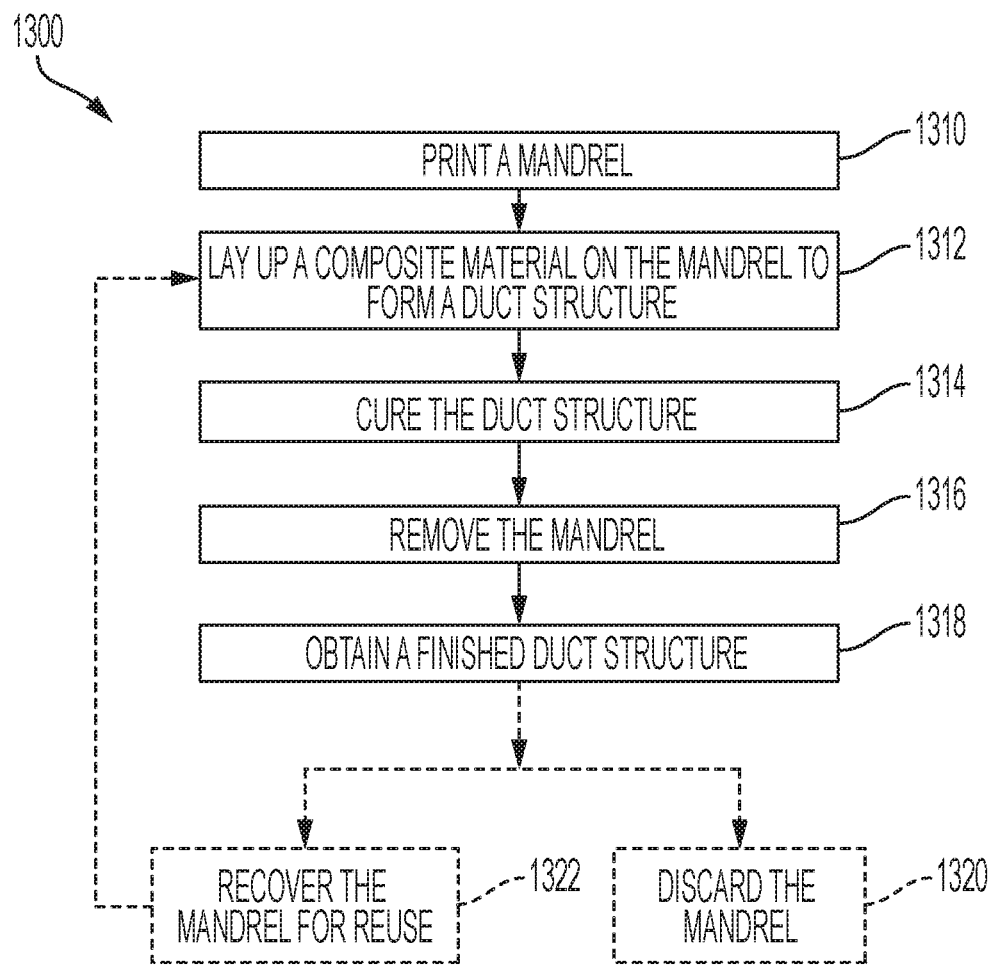
FIG. 13 is a flow chart depicting steps of a method of manufacturing a composite duct according to the present teachings.

This section describes steps of an illustrative method for manufacturing a duct from a composite material; see FIG. 13. Aspects of mandrels, ducts, additive manufacturing methods, and/or additive manufacturing devices previously described may be utilized in the method steps described below. Where appropriate, reference may be made to components and systems that may be used in carrying out each step. These references are for illustration, and are not intended to limit the possible ways of carrying out any particular step of the method.

FIG. 13 is a flowchart illustrating steps performed in an illustrative method, and may not recite the complete process or all steps of the method. Although various steps of method 1300 are described below and depicted in FIG. 12, the steps need not necessarily all be performed, and in some cases may be performed simultaneously or in a different order than the order shown.

Step 1310 includes printing a mandrel. For example, the mandrel may be printed according the method steps 1200 described in FIG. 12. The mandrel may be a single-use mandrel, where the mandrel is removed from the formed duct and discarded as described below. Alternatively, the mandrel may be reusable, where the mandrel is recovered from the formed duct and reconnected for reuse in forming composite ducts as described below.

Step 1312 includes depositing one or more layers of a composite material on the mandrel. The composite material is laid up or assembled as plies on an outer surface of the mandrel. In some examples, the outer surface of the mandrel may be prepared for layup by application of an intermediary substance and/or wrapping in a material such as heat-protective sheathing.

The composite material may be a combination of a matrix (such as epoxy or BMI resin) and a reinforcement (such as carbon fiber, fiberglass, or Kevlar). The composite material may involve unidirectional materials (tapes, roving, tow preg, slit tape), woven materials (fabrics, braids, 3D weaves), chopped fibers, milled fibers or may be impregnated with resin. Composite layup may take place by way of conventional ply layup techniques, forming a layup that conforms to the simple or complex contoured surfaces of the linear or non-linear mandrel.

Composite material may be laid down in a circumferential, axial direction, or a helical pattern on the mandrel. In some examples, the various plies of the composite layup may be laid up manually or by hand. In some examples, the layup may be laid up using advanced fiber placement ("AFP") or automated tape laying ("ATP") manufacturing methods, or by any other known composite layup method as appropriate to match the duct design.

Step 1314 includes curing the composite layers to substantially secure the composite layers in position relative to one another. For example, step 1314 may involve applying thermal energy to the composite layers. For a thermoset polymer matrix material, curing may include a reaction that is initiated by the application of additional heat or chemical reactivity. For a thermoplastic polymeric matrix material, curing may include a solidification from the melted state. The composite layers, including the matrix and the reinforcement, may be cured by any appropriate method.

Step 1314 may further include securing a vacuum bag film to the mandrel with an adhesive interface to form a vacuum chamber. For example, the adhesive interface may include double-sided vacuum sealant tape, or any other suitable adhesive, device, mechanism, structure, apparatus, or combination thereof for substantially hermetically sealing a perimeter region of the vacuum bag film to the mandrel.

The mandrel may include first and second plugs at first and second ends. Each plug may have a generally cylindrically shaped cap portion. The vacuum bag film may be sealed to an outer circumferential surface of the cap portions of the mandrel. Step 1314 may further include a step of substantially evacuating the vacuum chamber after the vacuum bag film has been secured to the mandrel. In the substantially evacuated state, the vacuum bag film may apply a pressing force against the composite material as part of the curing process.

Step 1316 includes removing the mandrel from the duct structure. A first part of the removing step includes breaking of a printed link between the end plugs and the main body of the mandrel. In the present case, as the cap portions of the end plugs may be fused to the main body, and a mechanical slicer may be used to slice the cap portions from the main body. Then, a second part of the removing step includes breaking printed links between a plurality of segments of the main body. One or more segments may be flexed relative to the main body. Upon application of a threshold level of external force between each pair of adjacent segments, the printed links may break. The separated segments may then be easily removed from the duct.

Step 1318 includes obtaining the finished duct structure. The duct obtained after removing the mandrel according to the above step may comprise a part to be utilized in a larger assembly, a further step in a manufacturing process, and/or a standalone object. Accordingly, the duct structure may be transformed into a finished duct structure by operations such as surface finishing, scribing, cutting, trimming, punching, printing, painting, and/or the like, or any combination of these. Note that "finishing" in this context is with respect to the present operation, and not necessarily as to the overall manufacturing process. In some examples, the formed material may have one or more apertures or openings cut or punched. Finishing operations such as these may be performed by any suitable equipment or device.

Optional step 1320 includes discarding the mandrel. In some embodiments, when the mandrel is a single use mandrel, the mandrel may be disposable. In which case the mandrel may be discarded or recycled after it is removed from the duct structure.

Optional step 1322 includes recovering the mandrel. The mandrel may then be reassembled for re-use in the composite duct manufacturing process. For example, steps 1312-1318 may be repeated. The reassembly may include steps to connect the plurality of separated segments to re-form the main body. The reassembly may further include connecting the end plugs to the main body.

Illustrative Combinations and Additional Examples

This section describes additional aspects and features of additively manufactured mandrels, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A0. An additively manufactured mandrel comprising:

a plurality of separable segments arranged to form a main body having a first end and a second end, each separable segment connected to adjacent segments, wherein the adjacent segments are configured to separate from one another when subjected to a threshold applied force, and a first plug connected to a first end of the main body and configured to support the main body during a composite curing process.

A1. The additively manufactured mandrel of A0, further comprising:

a second plug connected to the second end of the main body and configured to support the main body during the composite curing process.

A2. The additively manufactured mandrel of A0 or A1, wherein the main body has an internal tubular cavity, the first plug having a cap portion attached to the first end of the main body, and a support member extending into the internal tubular cavity configured to provide internal support to the main body.

A3. The additively manufactured mandrel of A2, wherein the support member has an external surface that is separated from an internal surface of the main body by less than 10 thousandths of an inch.

A4. The additively manufactured mandrel of A2 or A3, wherein the support member has a support portion connected to a distal end of a shaft portion, a proximal end of the shaft portion being connected to the cap portion.

A5. The additively manufactured mandrel of A4, wherein each of the support portion of the support member and the internal tubular cavity of the main body has a substantially circular cross-section.

A6. The additively manufactured mandrel of any of A2-A5, wherein the cap portion of the first plug is connected to the segments of the main body by printed links configured to break or be cut after a composite curing process.

A7. The additively manufactured mandrel of any of A2-A6, wherein the cap portion of the first plug is connected to the segments of the main body by magnets configured to release when the segments are subjected to the threshold applied force, and to reengage for reuse of the mandrel in subsequent composite manufacturing procedures.

A8. The additively manufacture mandrel of A7, wherein the cap portion of the first plug and the main body has one or more pin-to-hole assembly devices for realigning the magnets when the mandrel is reassembled for a subsequent composite layup and curing procedure.

A9. The additively manufactured mandrel of any of A0-A8, wherein the main body has a linear core axis extending from the first end to the second end.

A10. The additively manufactured mandrel of any of A0-A9, wherein the main body has a non-linear core axis extending from the first end to the second end.

A11. The additively manufactured mandrel of any of A0-A10, wherein each of the segments extends from the first end to the second end of the main body.

A12. The additively manufactured mandrel of any of A0-A11, wherein adjacent segments of the main body are connected by printed links configured to break when the segments are subjected to an applied external force.

A13. The additively manufactured mandrel of any of A0-A12, wherein adjacent segments of the main body are connected by magnets configured to release when the segments are subjected to the threshold applied force, and to reengage for reuse of the mandrel in subsequent composite manufacturing procedures.

B0. A method of manufacturing a mandrel for use in a composite manufacturing procedure, comprising:

printing a plurality of separable segments configured to form a main body having a first end and a second end, and printing a first plug connected to the first end of the main body and configured to maintain assembly of the plurality of separable segments during the composite manufacturing procedure.

B1. The method of B0, wherein the step of printing the plurality of separable segments includes printing links between adjacent segments configured to break when the segments are subjected to a threshold applied force.

B2. The method of B0 or B1, wherein the first plug has a cap portion, and the step of printing the first plug includes printing links between the cap portion and the first end of the main body, the links being configured to break or be cut after the composite manufacturing procedure.

B3. The method of any of B0-B2, further comprising:

embedding magnets in the main body configured to maintain assembly of the plurality of separable segments during the composite manufacturing procedure, and to separate when the segments are subjected to a threshold applied force after the composite manufacturing procedure.

B4. The method of any of B0-B3, wherein the first plug has a cap portion, further comprising:

embedding magnets in the cap portion of the first plug configured to maintain assembly of the first plug with the main body during the composite manufacturing procedure, to allow separation of the first plug from the main body after the composite manufacturing procedure, and to allow reassembly of the first plug to the main body for reusing the mandrel in a subsequent composite manufacturing procedure.

B5. The method of any of B0-B4, further comprising:

disassembling and removing the plurality of separable segments from a workpiece after the composite manufacturing procedure.

B6. The method of B5, further comprising:

reassembling the plurality of separable segments with the first plug for reuse in a subsequent composite manufacturing procedure.

C0. An additively manufactured mandrel for manufacturing a composite tube, comprising:

a plurality of additively manufactured segments, and an additively manufactured linkage device connecting the segments to form a main body having first and second ends, wherein the main body has an outer shape corresponding to an inner shape of a composite tube section to be manufactured, and the linkage device is configured to maintain the outer shape of the main body during a composite curing process.

C1. The additively manufactured mandrel of C0, wherein the linkage device includes additively manufactured links, directly connecting adjacent segments of the main body, and is configured to release when the segments are subjected to a threshold applied force.

C2. The additively manufactured mandrel of C0 or C1, wherein the linkage device includes a plug connected to an end of the main body, indirectly connecting the segments through the plug.

C3. The additively manufactured mandrel of claim C2, wherein the plug is connected to the main body magnetically.

C4. The additively manufactured mandrel of any of C0-C3, wherein the segments are connected magnetically, allowing the mandrel to be reassembled for subsequent manufacturing of a composite tube.

Advantages, Features, and Benefits

The different examples of the additively manufactured mandrel described herein provide several advantages over known solutions for manufacture of composite ducts, tubes, and/or pipes. For example, illustrative examples described herein allow quick and inexpensive production of mandrels.

Additionally, and among other benefits, illustrative examples described herein allow manufacture of ducts with geometries not achievable using conventionally manufactured mandrels.

Additionally, and among other benefits, illustrative examples described herein allow rapid prototyping of new duct designs.

Additionally, and among other benefits, illustrative examples described herein reduce or eliminate the need to store, assemble and maintain duct mandrels.

Additionally, and among other benefits, illustrative examples described herein allow quick and easy mandrel removal, without further post-processing of a duct.

No known system or device can perform these functions, particularly with a lightweight and inexpensive material. The illustrative examples described herein are particularly useful for aircraft ducting. However, not all examples described herein provide the same advantages or the same degree of advantage.

CONCLUSION

The disclosure set forth above may encompass multiple distinct examples with independent utility. Although each of these has been disclosed in its preferred form(s), the specific examples thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A mandrel, comprising:
    a plurality of separable segments arranged to form a main body having a first end, a second end, and an internal cavity, each separable segment connected to adjacent segments by links, wherein the links are configured to break or be cut and the adjacent segments are configured to separate from one another when subjected to a threshold applied force, and
    a first plug connected to the first end of the main body and configured to support the main body, the first plug including a cap portion outside the internal cavity and a support member inside the internal cavity, and the cap portion being connected to each segment by the links, wherein:
        the links, the segments, the cap portion, and the support member have an identical composition, and
        a diameter of the cap portion is greater than a diameter of the internal cavity.

2. The mandrel of claim 1, further comprising:
    a second plug connected to the second end of the main body and configured to support the main body, the first plug and the second plug being only indirectly connected by the main body.

3. The mandrel of claim 2, wherein the second plug includes a cap portion entirely outside the internal cavity and a support member inside the internal cavity, the support member of the second plug has an external surface that is separated from the main body, and a diameter of the cap portion of the second plug is greater than a diameter of the internal cavity.

4. The mandrel of claim 1, wherein the support member has an external surface that is separated from an internal surface of the main body by a gap of between 1 and 10 thousandths of an inch.

5. The mandrel of claim 1, wherein the support member has a block portion connected to a distal end of a shaft portion, a proximal end of the shaft portion being connected to the cap portion.

6. The mandrel of claim 5, wherein the first plug is dumbbell shaped, the shaft having a diameter smaller than a diameter of the cap portion and a diameter of the block portion.

7. The mandrel of claim 1, wherein the cap portion of the first plug is connected to the segments of the main body by magnets configured to release when the segments are subjected to the threshold applied force, and to reengage for reuse of the mandrel.

8. The mandrel of claim 7, wherein the cap portion of the first plug and the main body has one or more pin-to-hole assembly devices for realigning the magnets when the mandrel is reassembled.

9. The mandrel of claim 1, wherein the main body has a non-linear core axis extending from the first end to the second end.

10. The mandrel of claim 1, wherein each of the plurality of separable segments is connected to an inner face of the cap portion.

11. The mandrel of claim 10, wherein the cap portion is entirely outside the internal cavity.

12. The mandrel of claim 11, wherein the cap portion overlaps an end surface of the segments.

13. The mandrel of claim 1, wherein the support having has an external surface that is separated from the main body by a gap, the support member being only indirectly connected to the main body.

14. A method of manufacturing a mandrel for use in a composite manufacturing procedure, comprising:
    printing a plurality of separable segments configured to form a main body having a first end, a second end, and an internal cavity, and
    printing a first plug connected to the first end of the main body and configured to maintain assembly of the plurality of separable segments during the composite manufacturing procedure, including a cap portion outside the internal cavity and a support member inside the internal cavity, the support member having an external surface that is separated from the main body,
    wherein:
        the step of printing the plurality of separable segments includes printing links between adjacent segments and between each segment and the cap portion, the links being configured to break when the segments or the cap portion are subjected to a threshold applied force,
        a diameter of the cap portion is greater than a diameter of the internal cavity, and
        the plurality of separable segments, the first plug, and the links are printed with an identical composition.

15. The method of claim 14, further comprising:
    disassembling and removing the plurality of separable segments from a workpiece after the composite manufacturing procedure.

16. The method of claim 14, further comprising:
    reassembling the plurality of separable segments with the first plug for reuse in a subsequent composite manufacturing procedure.

17. An additively manufactured mandrel for manufacturing a composite tube, comprising:
a plurality of additively manufactured segments, and
an additively manufactured linkage device connecting the segments to form a main body having first and second ends and an internal cavity, the linkage device including:
printed links configured to break or be cut, and
a plug configured to support the main body, including a cap portion entirely outside the internal cavity and a support member entirely inside the internal cavity,
wherein:
the main body has an outer shape corresponding to an inner shape of a composite tube section to be manufactured,
the linkage device is configured to maintain the outer shape of the main body during a composite curing process,
a diameter of the cap portion is greater than a diameter of the internal cavity,
each of the plurality of segments is connected to an inner face of the cap portion by the printed links, and
the segments, the plug, and the printed links have an identical composition.

18. The additively manufactured mandrel of claim 17, wherein the links directly connect adjacent segments of the main body.

19. The additively manufactured mandrel of claim 17, wherein the plug is connected to one of the first and second ends of the main body, and the links connect the segments to the plug.

20. The mandrel of claim 17, wherein the plurality of segments and the linkage device are a single unitary structure.

* * * * *